United States Patent Office 2,839,788
Patented June 24, 1958

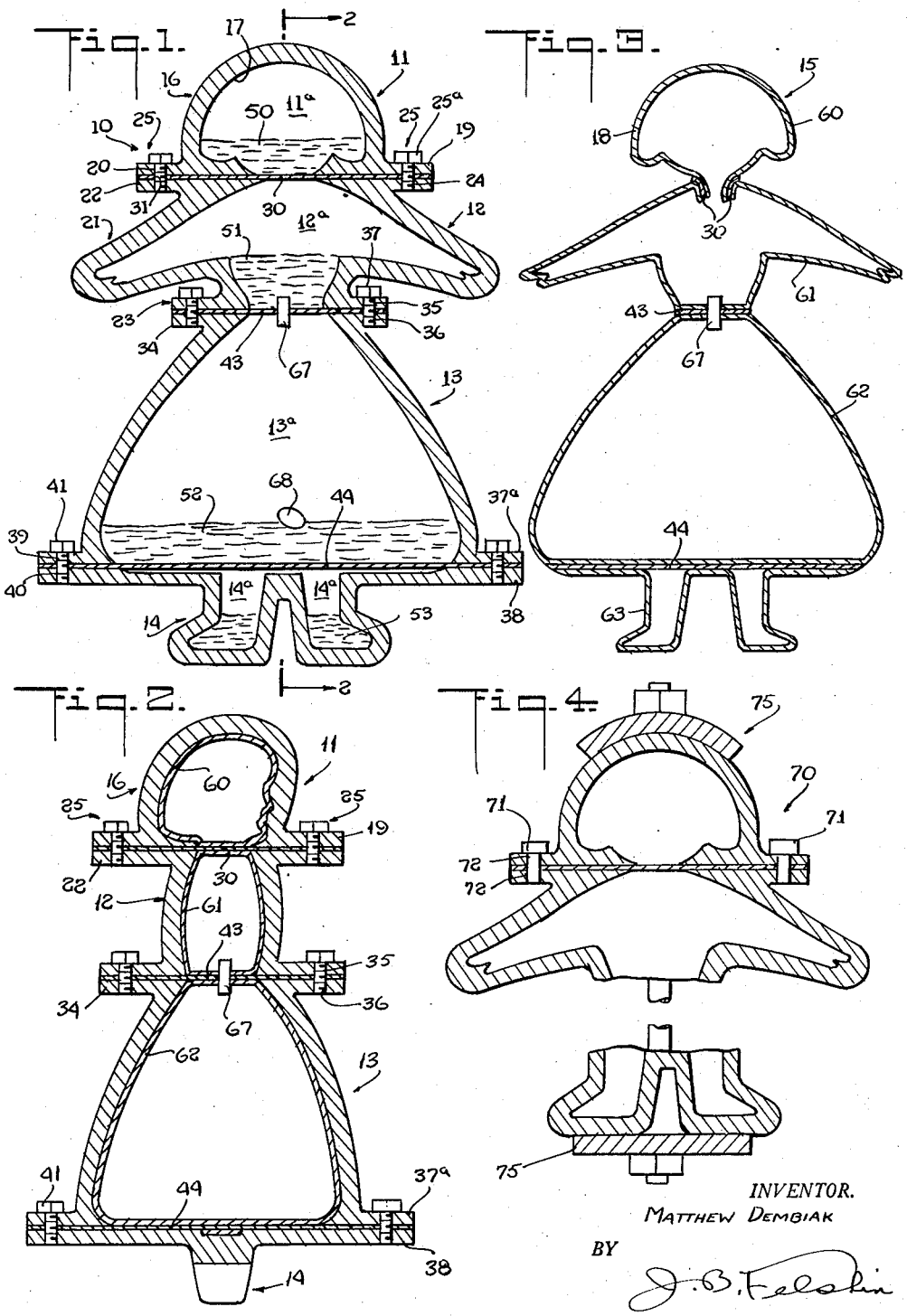

2,839,788

METHOD OF MAKING HOLLOW PLASTIC OR RUBBER ARTICLES

Matthew Dembiak, Wallington, N. J.

Application April 24, 1953, Serial No. 350,974

4 Claims. (Cl. 18—58.3)

This invention relates to apparatus for and method of making hollow plastic or rubber articles.

Hollow plastic or rubber articles of the collapsible type have heretofore been made by inserting liquid, heat setting plastics, such as plastisol into a hollow mold and tumbling the mold in various directions so that the plastic material is swished around against the interior surfaces of the mold, during which operation the mold is heated, so that the plastic material will coat the interior surfaces of the mold and become set and cured at higher temperatures, after which the article is removed from the mold.

Difficulty has been experienced in such procedure in that the molded article was necessarily of one color, and had to be painted or decorated to give it more charm and color.

An object of this invention is to provide an apparatus for and method of making hollow plastic or rubber articles in molds, with different parts of the article of different color, separated sharply from one another at predetermined places.

A further object of this invention is to provide in an apparatus of the character described, a hollow mold comprising a plurality of mold sections attached together, with a diaphragm interposed between each pair of adjacent sections, said diaphragms being of such materials that they will fuse with the liquid plastic on both sides thereof. With such construction liquid plastic of different colors may be inserted into each section, so that the various sections of the completed molded article will have different colors corresponding to the different sections of the mold. The diaphragm should be of a cured material of such composition to permit fusion with the liquid plastic in the sections on opposite sides thereof. The diaphragms should furthermore be of a material which will not collapse at the setting temperature of the liquid plastic. However, if it is desired, the diaphragm could be of such thin guage as to rupture at the cured temperature so as to cause the chambers on opposite sides of the diaphragm to intercommunicate. The diaphragms may be rigid, semi-rigid or soft and will fuse with the liquids inserted into the various sections. Complete control of all the chambers can be maintained by diaphragms at the parting surfaces of the various sections or at the sealing points where the diaphragms are placed within the mold. Furthermore, articles may be inserted into or mounted on the diaphragm or may be placed into various chambers or sections if desired. By having control of separation of sections and color, a great advantage is attained since articles can be made more attractive than by painting, thus resulting in a more decorative and durable product. Furthermore, any chamber may be sealed off in the form of a cushion by this method of making hollow articles.

Other advantages of the present invention may be enumerated as follows:

This method permits molding of plastics of two or more viscosities in one cavity. Thus plastic materials of different viscosities may be placed in different sections. Also the thickness of the skin may be controlled in the molding. Some sections can have thicker skins than other sections by controlling the amount of liquid plastic material put into the section. Of course this method permits molding of two or more colors at one time, since it permits molding in two or more piece molds, each section holding its own color.

Furthermore, with the present invention there is better control of the thickness in each section, since each section is smaller, whereas in a large mold cavity, as heretofore used, there was some difficulty in getting the plastic material to evenly coat all parts of the cavity. The entire molded article can become one hollow object if the diaphragms are ruptured. These diaphragms can be broken by stretching or by controlling its thickness or its breaking point at certain temperatures.

Whistles or other noise making devices may be placed in the diaphragms and thus different sounds may be attained by squeezing different parts of the device.

Furthermore the different chambers may have different pressures. This may be accomplished by putting gas pellets in different chambers if desired. Furthermore, any desired chamber may be isolated to retain sufficient air pressure to support the object or to permit the object to bounce.

This improved method permits running of two or more materials which normally cannot be blended together, but by separating them into various chambers, each can be thermally set in its own chamber. This method furthermore will permit molding of rigid or semi-rigid plastic or other material in one operation with flexible or collapsible material. Thus with this method materials which will set hard or semi-rigid can be used, and furthermore foam plastic may be used for certain parts.

This method furthermore can permit the setting of two or more ranges of thermal setting material over each layer. Furthermore the diaphragm can be punctured at a certain temperature to cause material from one chamber to spill into the next chamber. Furthermore this method will permit the setting of two or more ranges of thermal setting material in separate chambers. The diaphragms at the parting surfaces can support objects which normally would have to be sealed at the seam after inserting the object. Thus, a double diaphragm may be used and an object placed between the diaphragms. A weight or a music mechanism may be placed between the diaphragms.

With this invention diaphragms at any parting surface will permit molding of a virgin material on the first layer and a secondary material or sponge material on the inside layer. The parting surface can be made to bond or can be made to separate. Thus talcum power or other suitable material can be placed between two diaphragms to permit the entire device to break in two after the molding operation. Furthermore different surface textures can be obtained in the separate chambers. Furthermore this method will facilitate ease in balancing an object at any point. Thus more material can be placed in one chamber than in another so that any desired chamber will have a greater thickness to add weight to that chamber.

Still a further object of this invention is to provide a simple apparatus of the character described, which shall be relatively inexpensive to manufacture, easy to manipulate, economical to use, and which shall yet be practical and efficient to a high degree.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the drawings forming a part of this invention and accompanying the same:

Fig. 1 is a vertical cross sectional view through a mold illustrating the apparatus and method embodying the invention;

Fig. 2 is a cross sectional view taken on the line 2—2 of Fig. 1;

Fig. 3 is a view similar to Fig. 1 but showing a finished doll; and

Fig. 4 is a partial view similar to Fig. 1 and illustrating a modified construction.

Referring now in detail to the drawing, 10 designates an apparatus embodying the invention for carrying out the improved method. The apparatus 10 comprises a mold for making hollow, plastic or rubber collapsible articles. The mold 10 comprises a plurality of sections designated by the numerals 11, 12, 13, and 14. This mold, for the purpose of illustration, is shaped to produce a doll 15.

The inner surfaces of the various sections are engraved in such a manner as to determine the outer surface of the doll 15. The section 11 comprises a hollow mold portion 16 having an inner mold surface 17 corresponding to the outer surface 18 of the head end of the doll 15. Extending from the hollow portion 16 are flanges 19 provided with a plurality of through openings 20. Sections 12 takes care of the body portion of the doll from the waistline to the neck. It comprises a hollow portion 21 provided with a flange 22 at its upper or neck end, and with a flange 23 at its lower or waist end. The flange 22 is complementary to the flange 19. It is formed with through threaded openings 24. Stud screws 25 have shanks passing through the openings 20 and screwed to the threaded openings 24. The heads 25a of the screws may contact the flanges 19. Thus the screws 25 serve to attach the sections 11 and 12 together.

Between said sections is placed a diaphragm 30. The diaphragm 30 is formed with openings 31 through which the shanks of the screws 25 pass. Thus the diaphragm contacts the complementary surfaces of the flanges and sections 11 and 12. The diaphragm is of such material that it will fuse with liquid plastic such as plastisol placed in the sections at opposite sides thereof. The diaphragm is preferably cured. It may be made of polyvinyl chloride or polyvinyl chloride plus acetate or of any other suitable material.

Within section 11 is formed a hollow chamber 11a. Within section 12 is formed a hollow chamber 12a. Within section 13 is formed a hollow chamber 13a and within section 14 are formed hollow chambers 14a. Section 13a is for the body of the doll from the waistline to the bottom of the skirt, and section 14, is for the feet and legs of the doll.

Section 13 has flanges 34 at its upper end complementary to the flanges 23. Flanges 23 are formed with through openings 35 and flanges 34 are formed with registering threaded openings 36. Screws 37 pass through the openings 35 and are screwed within the openings 36 for attaching section 13 to section 12. Section 13 has bottom flanges 37a. Section 14 has at its upper end complementary flanges 38. Flanges 37a are formed with through openings 39 and flanges 38 may be formed with through openings 40. Screws 41 similarly serve to attach the flanges 37a, 38 together by passing through the openings 39 and engaging the threads of openings 40.

Between sections 12 and 13 is placed a diaphragm 43. Between sections 13 and 14 is placed a diaphragm 44. The diaphragm 43 is interposed between flanges 23 and 34. The diaphragm 44 is interposed between flanges 37a and 38. The screws 37 pierce the diaphragm 43. The screws 41 pierce the diaphragm 44.

Liquid plastic material 50 is placed in the chamber 11a. Liquid plastisol material 51 is placed in the chamber 12a. Liquid plastisol material 52 is placed in the chamber 13a and liquid plastisol material 53 is placed in the chamber 14a. The plastisol may be mixed with polyvinyl chloride, resin and a plasticide. The entire mold may be placed in a machine for tumbling or turning the mold in various directions so that the liquid plastic in each chamber will swish around and coat the interior surfaces of the chamber and the surfaces of the diaphragms facing said chamber.

During such process the device is heated to a temperature of 170° F. to 180° F. for several minutes causing the plastic material to cling to the walls and to the diaphragms and to set. Thereafter the heat is brought up to a temperature of about 275° F. to 450° F. for six to ten minutes. The plastic material will cling to the interior surfaces of the mold sections and to the diaphragm as shown in Fig. 2 of the drawing to form a doll head 60, a doll body and arms 61 extending from the waist to the neck, doll skirt 62 extending from the waist down and doll legs 63. By placing liquid plastic of different colors in the various sections, different colors may be obtained in different parts of the doll. Thus parts 61, 62, 63 can all have different colors. The plastic material fuses or blends with the diaphragms. If desired any one of the diaphragms may be made so thin that at the final cured temperature it will break as shown in Fig. 3 of the drawing at the neck of the doll. The breaking of the diaphragm may also be accomplished by stretching or pulling. It will be noted that both sides of each diaphragm are coated with material in the sections on opposite sides thereof.

If desired, objects such as a whistle, reed of noise producing device 67 may be placed in one of the diaphragms so that air rushing through the device will produce noise when the article is squeezed. Also a gas pellet 68 may be placed in any one of the sections, here shown in chamber 13a, and this gas pellet will burst at predetermined increased temperatures so as to provide increased gas pressure in said chamber. By varying the amount of liquid plastic material in any chamber, the thickness of the wall in any desired part of the doll may be controlled.

It will be noted that various chambers are completely sealed off so as to provide a cushion or to permit the article to bounce. Thus a shoe could be molded with this method and the heel could be completely sealed off by the diaphragm to provide an air cushion heel, or a bouncing toy may be provided and various parts may be sealed off so that the air of increased pressure obtained from pellet 68 will cause a bounce.

It will be noted that if the entire doll were made of a single hollow mold, it would be more difficult for the liquid plastic material to swish evenly throughout the doll. For example, it might be difficult for some of the plastic material to flow through the narrow neck portion of the doll. By making the mold in separate sections it is easier for the plastic material to swish around in a single section. Plastic materials of different viscosities may be placed in different chambers. Some sections may be made thicker than others if desired. The diaphragms may be semi-rigid, rigid or soft or some of the molded sections may receive plastic which will set hard so as to combine in the one article both rigid or semi-rigid portions.

This method will permit setting of two or more ranges of thermal setting material either in the same chamber or in separate chambers. Where they are in the same chamber one material may set at a different temperature than the other so as to produce layers of different material.

If desired, any one of the diaphragms may comprise a double layer and talcum may be placed therebetween so that the molded article may be separated, or if desired, some object may be placed between the layers to hold it in place during the molding of the article. If desired, foam plastic may be placed in any one of the chambers.

In Fig. 4 there is shown a modified construction. The apparatus 70 shown in Fig. 4 is similar to the apparatus 10 with the exception that the adjacent sections, instead of being attached together by screws, are merely held together in correlated position by pins 71, having shanks passing through registering openings 72, in complementary flanges. All the sections may then be clamped together by a single clamp 75 and then turned in various directions to swish the liquid plastic around so as to coat the insides of the various sections.

It will of course be obvious that the diaphragms are trimmed at the body to get rid of the excess flanges which extend beyond the body.

It will thus be seen that there is provided a device in which the several objects of this invention are achieved and which is well adapted to meet the conditions of practical use.

As possible embodiments might be made of the above invention, and as various changes might be made in the embodiment above set forth, it is to be understood that all matter herein set forth or shown in the accompanying drawing, is to be interpreted as illustrative and not in a limiting sense.

Having thus described my invention in some detail, what I claim as new and desire to protect by Letters Patent of the United States, is:

1. The method of making a hollow unitary plastic article which comprises, providing a hollow mold including a plurality of sections, each conforming to a portion of the article to be made, placing diaphragms between adjacent sections of the hollow mold to separate the various sections into separate chambers, removably securing the mold sections together with the diaphragms clamped therebetween, placing liquid thermo setting plastic material in each chamber, then turning the mold in various directions to cause the plastic to coat and cling to the interior surfaces of the chambers and fuse with said diaphragms, heating the mold during such turning to set the plastic material and thereafter separating the mold sections.

2. A method of making a hollow unitary plastic article which comprises, providing a hollow mold including a plurality of sections, each conforming to a portion of the article to be made, placing a diaphragm of cured plastic material between each of two adjacent sections of the mold, placing liquid, thermal setting plastic in the separated sections, clamping said mold sections together with the diaphragms in between, moving the mold to cause the liquid plastic material to coat the interior of the sections and to cling to and fuse with adjacent surfaces of the diaphragms, heating the mold during such movement, to set the coating and increasing the heat to cure the coated material and thereafter removing the mold sections.

3. The method according to claim 2, comprising the additional step of trimming the portions of the diaphragm which extend beyond the molded article.

4. A method of making a hollow unitary plastic article which comprises, providing a hollow mold including a plurality of sections, each conforming to a portion of the article to be made, placing a diaphragm of cured plastic material between each of two adjacent sections of the mold, placing an article within one of the diaphragms in spaced relation to the adjacent mold sections, placing liquid, thermal setting plastic in the separated sections clamping said mold sections together with the diaphragms in between, moving the mold to cause the liquid plastic material to coat the interior of the sections and to cling to and fuse with adjacent surfaces of the diaphragms, heating the mold during such movement, to set the coating and increasing the heat to cure the coated material, and thereafter unclamping said mold sections.

References Cited in the file of this patent

UNITED STATES PATENTS

| | | |
|---|---|---|
| 1,906,028 | Weber et al. | Apr. 25, 1933 |
| 1,948,486 | Bemis | Feb. 27, 1934 |
| 2,204,195 | Steinmetz | June 11, 1940 |
| 2,310,619 | Dillehay | Feb. 9, 1943 |
| 2,313,985 | Bradshaw | Mar. 16, 1943 |
| 2,469,892 | Rempel | May 10, 1949 |
| 2,486,965 | Dresser | Nov. 15, 1949 |
| 2,569,157 | Evensen | Sept. 25, 1951 |
| 2,651,079 | Michaelson et al. | Sept. 8, 1953 |
| 2,659,107 | De Bell | Nov. 17, 1953 |
| 2,663,905 | Van Riper et al. | Dec. 29, 1953 |